United States Patent
Kong et al.

(10) Patent No.: US 11,655,753 B2
(45) Date of Patent: May 23, 2023

(54) ELBOW FOR TURBOCHARGER OF VEHICLE AND CONNECTING STRUCTURE THEREOF

(71) Applicants: Hyundai Motor Company, Seoul (KR); Kia Corporation, Seoul (KR)

(72) Inventors: JeongEui Kong, Gyeonggi-do (KR); Hee Yong Choi, Gyeonggi-do (KR); Jun Hee Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/872,876

(22) Filed: Jul. 25, 2022

(65) Prior Publication Data

US 2023/0102305 A1   Mar. 30, 2023

(30) Foreign Application Priority Data

Aug. 20, 2021 (KR) .......................... 10-2021-0110380

(51) Int. Cl.
*F02B 33/44* (2006.01)
*F02M 35/10* (2006.01)

(52) U.S. Cl.
CPC ....... *F02B 33/44* (2013.01); *F02M 35/10111* (2013.01); *F02M 35/10157* (2013.01)

(58) Field of Classification Search
CPC .............. F02B 33/44; F02M 35/10111; F02M 35/10157
See application file for complete search history.

(56) References Cited

U.S. PATENT DOCUMENTS

| 6,116,288 A * | 9/2000 | Yamamura | F16L 11/115 138/121 |
|---|---|---|---|
| 11,415,141 B1* | 8/2022 | Wang | F04D 27/0207 |
| 2010/0269804 A1* | 10/2010 | Miyaji | F02M 35/10222 123/572 |
| 2018/0038387 A1* | 2/2018 | Fujiwara | F04D 29/4213 |

FOREIGN PATENT DOCUMENTS

| JP | 2011047358 A | * | 3/2011 |
|---|---|---|---|
| KR | 10-2020-0140115 A | | 12/2020 |

OTHER PUBLICATIONS

APR 2.5 TFSI Evo Turbocharger Inlet System (https://web.archive.org/web/20200920103400/https://www.goapr.com/products/engine_hardware/intake/turbocharger_inlet_pipes/parts/CI100038), Wayback Machine, Sep. 20, 2020 (Year: 2020).*

* cited by examiner

*Primary Examiner* — Mickey H France
*Assistant Examiner* — Edward Bushard
(74) *Attorney, Agent, or Firm* — Fox Rothschild LLP

(57) ABSTRACT

An intake system of an engine of a vehicle includes a turbocharger having an elbow configured to be connected to a compressor of the turbocharger. The elbow for the turbocharger includes: an inlet through which a first fluid is introduced; an outlet through which the first fluid is discharged; a passageway part extending between the inlet and the outlet; and a fusion part provided between the inlet and the outlet and configured to communicate with an inside of the passageway part.

7 Claims, 10 Drawing Sheets

ELBOW FOR TURBOCHARGER OF VEHICLE AND CONNECTING STRUCTURE THEREOF

CROSS REFERENCE TO RELATED APPLICATION

The present application claims under 35 U.S.C. § 119(a) the benefit of Korean Patent Application No. 10-2021-0110380, filed Aug. 20, 2021, the entire contents of which is incorporated herein by reference.

BACKGROUND

(a) Technical Field

The present disclosure relates to an intake system of an engine of a vehicle, more particularly, to an elbow configured to be connected to a compressor of a turbocharger in the intake system.

(b) Description of the Related Art

A piston ring is arranged to maintain airtightness between a cylinder wall and a piston when the piston reciprocates in a cylinder of an engine. However, particles such as oil, fuel, and the like are introduced into a crankcase through a gap between the cylinder wall and the piston for reasons such as damage to the piston ring, failure to perform a perfect seal, and the like. Gas produced in this way is referred to as blow-by gas. Such blow-by gas is configured to be recirculated from the crankcase to an intake system of the engine.

The intake system of the engine includes: an air cleaner; a turbocharger; and an intake hose which connects the air cleaner and the turbocharger to each other and is generally made of rubber, plastic, or the like. Outside air introduced into the intake system is filtered at the air cleaner. The air passing through the air cleaner is introduced into the turbocharger, more specifically, the compressor of the turbocharger through the intake hose and is compressed.

In general, the intake hose is provided with a supply unit configured to introduce the blow-by gas therein. The blow-by gas is introduced into the intake system through the supply unit. In a conventional structure, there is a problem in that blowout oil of the blow-by gas flows back to the intake system and the air cleaner side by a surge of the turbocharger, whereby contamination occurs, and a sensing error of a mass air flow sensor is induced.

The foregoing is intended merely to aid in the understanding of the background of the present disclosure and is not intended to mean that the present disclosure falls within the purview of the related art that is already known to those skilled in the art.

SUMMARY

Accordingly, the present disclosure provides an elbow for a turbocharger of a vehicle, the elbow being capable of preventing blowout oil from flowing back into an air cleaner side.

An objective of the present disclosure is not limited to the objective mentioned above, and other objectives not mentioned are clearly understood by those (hereinafter referred to as "person of ordinary skill") of ordinary skill in the art to which the present disclosure belongs from the description below.

In order to achieve the above objective, according to one aspect of the present disclosure, there may be provided an elbow for a turbocharger of a vehicle, the elbow including: an inlet through which a first fluid is introduced; an outlet through which the first fluid is discharged; a passageway part extending between the inlet and the outlet; and a fusion part provided between the inlet and the outlet and configured to communicate with an inside of the passageway part.

According to some embodiments of the present disclosure, there may be provided a connecting structure of a turbocharger of a vehicle, the connecting structure including: an elbow including an inlet through which a first fluid is introduced, an outlet through which the first fluid is discharged, a passageway part extending between the inlet and the outlet, and a fusion part provided between the inlet and the outlet and configured to communicate with an inside of the passageway part; and an oil line inserted into the fusion part and configured to communicate with the passageway part.

As described above, according to the present disclosure, there is provided an elbow for a turbocharger, the elbow being capable of preventing blowout oil from flowing back into an air cleaner side.

Effects of the present disclosure are not limited to those described above, and other effects not mentioned will be clearly recognized by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
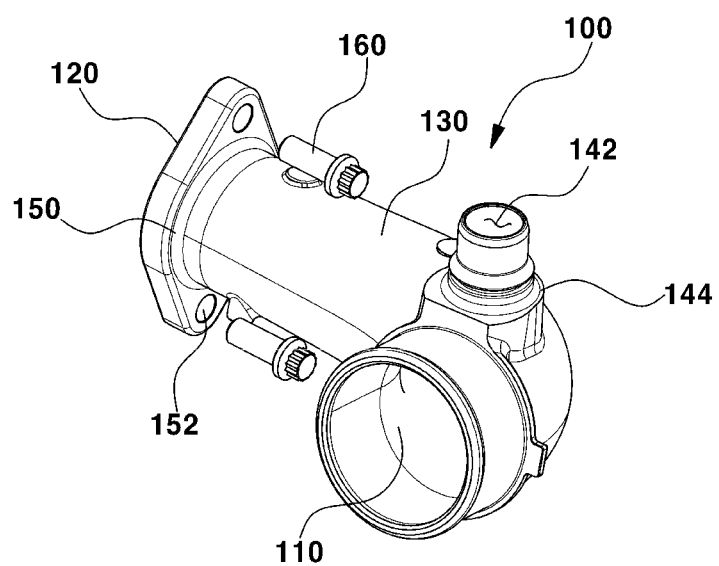
FIG. 1 is a perspective view showing an elbow for a turbocharger according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting.

Hereinafter, the present disclosure will be described in detail with reference to the accompanying drawings.

Figure 2:
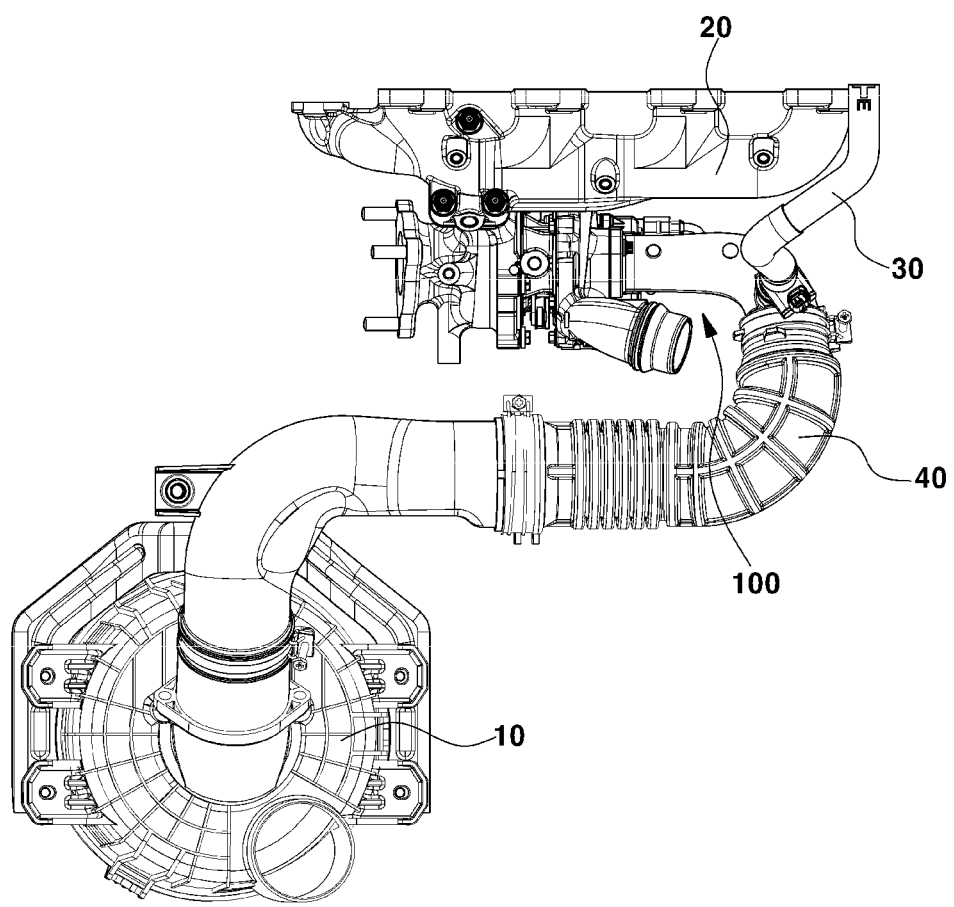
FIG. 2 is a view showing an intake system of a vehicle in which the elbow for a turbocharger according to the present disclosure is installed.
Figure 3:
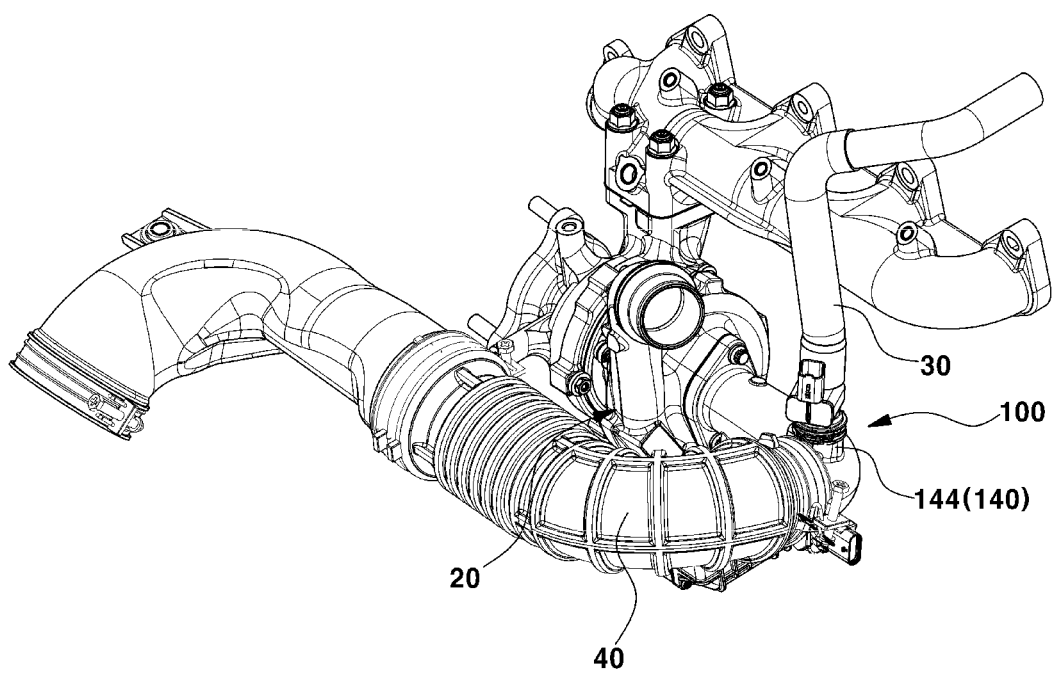
FIG. 3 is a view showing a state in which the elbow for a turbocharger according to the present disclosure is mounted on the turbocharger and a hose, and the arrow direction indicates a direction viewed from the front of the vehicle.

As shown in FIGS. 1 to 3, an elbow 100 for a turbocharger according to the present disclosure includes: an inlet 110, an outlet 120, and a passageway part 130. The inlet 110 is connected to an air cleaner 10. The outlet 120 is connected to an inlet of the turbocharger 20, more specifically, an inlet of a compressor of the turbocharger 20. The passageway part 130 extends between the inlet 110 and the outlet 120 and may be configured in an elbow shape.

Air filtered through the air cleaner 10 is introduced into the inlet 110. The air introduced through the inlet 110 flows along the passageway part 130 and is discharged through the outlet 120. The discharged air is supplied to the turbocharger 20.

Figure 4:
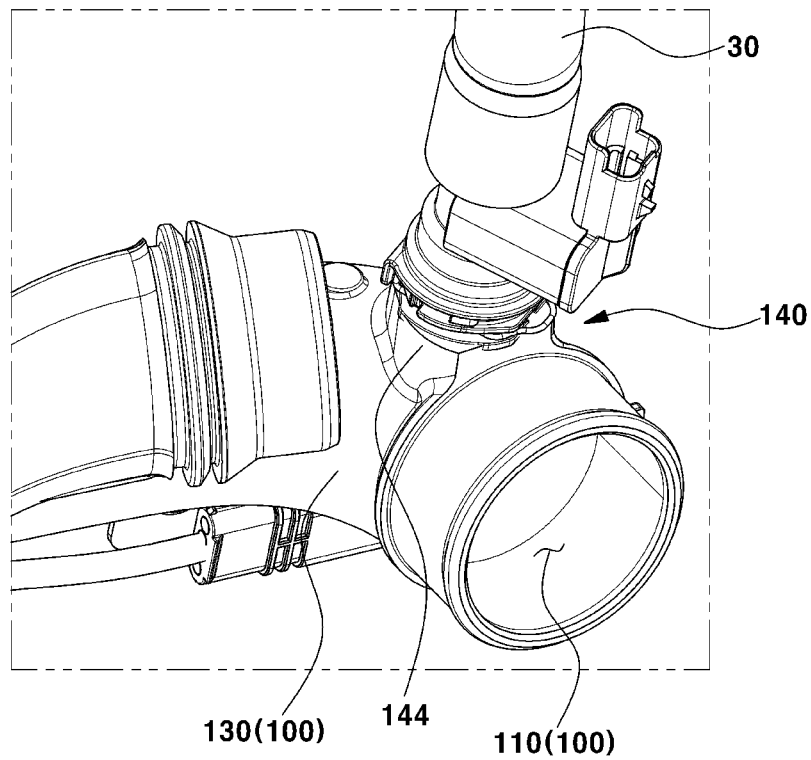
FIG. 4 is a perspective view showing the elbow for a turbocharger according to the present disclosure.
Figure 5:
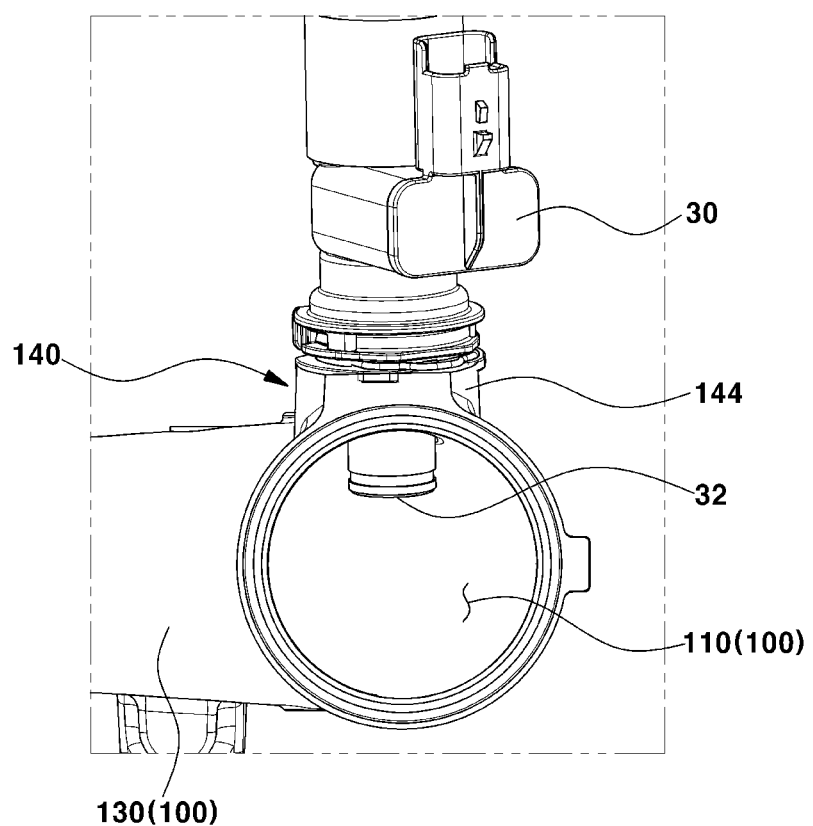
FIG. 5 is a front view of FIG. 4.

As shown in FIGS. 4 and 5, the elbow 100 according to the present disclosure includes a fusion part 140. The fusion part 140 is provided in the passageway part 130 between the inlet 110 and the outlet 120. According to an embodiment of the present disclosure, the fusion part 140 is provided at a position closer to a side of the inlet 110 rather than a side of the outlet 120.

Figure 6:
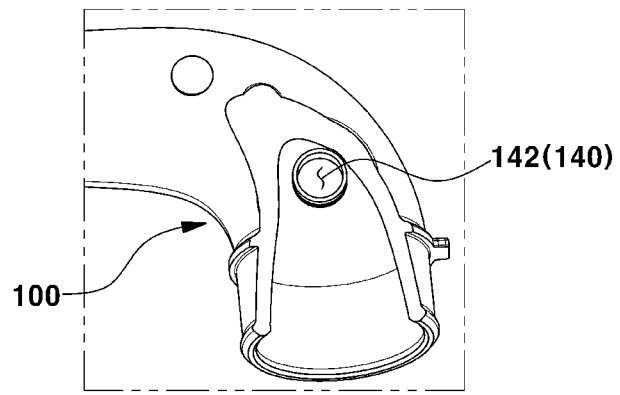
FIG. 6 is a plan view of FIG. 4 and shows a partially cut-away cross-sectional view.
Figure 7:
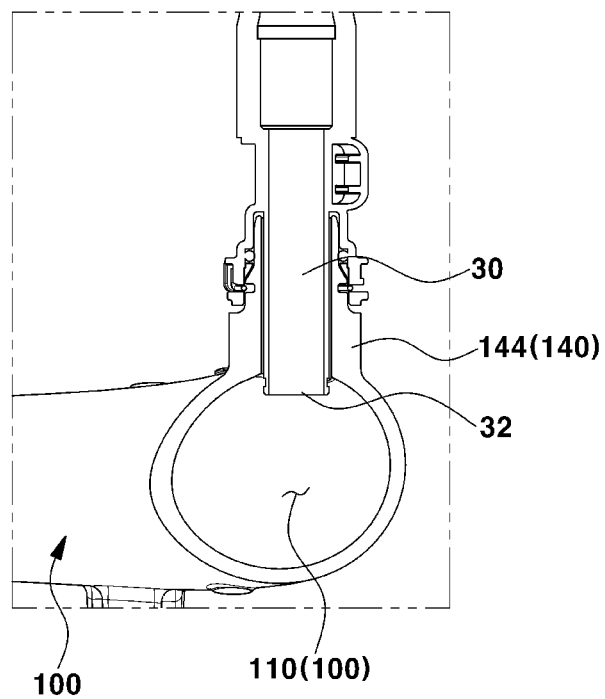
FIG. 7 is a partially cut-away cross-sectional view of FIG. 5.

As shown in FIGS. 6 and 7, the fusion part 140 is formed passing through the passageway part 130 to communicate with the interior of the passageway part 130. The fusion part 140 may be configured to pass through along a radial direction of the passageway part 130. According to an embodiment of the present disclosure, the fusion part 140 is a hollow portion 142 formed at a portion of a perimeter of the passageway part 130.

According to an embodiment of the present disclosure, the fusion part 140 includes a protrusion 144 that protrudes from the portion of a perimeter of the passageway part 130. The hollow portion 142 is provided at an inner side of the protrusion 144.

The fusion part 140 may be disposed substantially perpendicular to a flow direction of the air in the passageway part 130. That is, the fluid or blowout oil flowing into the passageway part 130 through the fusion part 140 is introduced perpendicular to the flow direction of the air.

In addition, the fusion part 140 may be provided on a top side of the perimeter of the elbow 100. In particular, the fusion part 140 is configured to be positioned on the top side of the elbow 100 in a state where the elbow 100 is connected to the turbocharger 20.

The blowout oil is introduced into the fusion part 140. In particular, the fusion part 140 is equipped with an oil line 30 to which blowout oil is supplied. Accordingly, the blowout oil flowing along the oil line 30 is configured to fall into the passageway part 130 through the fusion part 140. According to the present disclosure, the fusion part 140 into which the blowout oil is introduced is formed in the elbow 100 rather than a conventional intake hose. Therefore, according to the present disclosure, it is possible to remove oil stagnation in a connection part and the obstacles to the oil inflow by preventing the blowout oil from going through a step that occurs due to conventional clamping between the turbocharger and the intake hose.

With reference back to FIG. 7, according to an embodiment of the present disclosure, the oil line 30 may extend up to an inside of the passageway part 130 through the fusion part 140. That is, an outlet 32 of the oil line 30 is provided to have a diameter no greater than that of the hollow portion 142, and may be disposed inside the cross section of the elbow 100.

Figure 8:
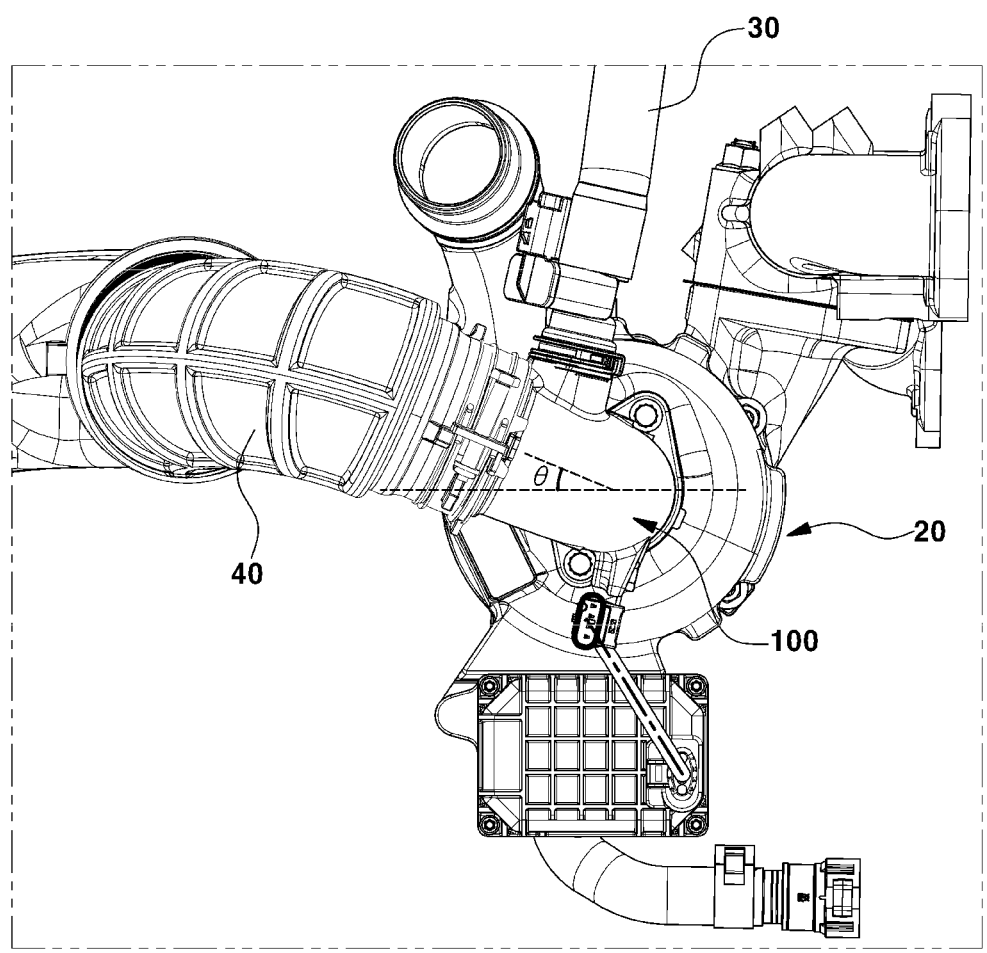
FIG. 8 is a view showing the elbow for a turbocharger according to the present disclosure as viewed from the front of the vehicle.

With reference to FIG. 8, the elbow 100 according to the present disclosure is configured to have a downward gradient in an overall shape. That is, a downward slope is formed from the side of the inlet 110 to the side of the outlet 120. The downward slope may be formed by allowing an inclination angle θ to be configured to form when a hose 40 is connected after the engine is mounted on the vehicle. According to the present disclosure, the elbow 100 has a downward gradient, so the blowout oil does not accumulate and flows more easily toward the turbocharger 20 due to a head difference. In addition, when a reverse flow of the blowout oil occurs due to a surge, the surge energy may be reduced by first colliding with a wall surface of the elbow 100. Meanwhile, the inclination angle θ of the elbow 100 having a downward slope is 15° to 40°. In addition, the inclination angle θ may be 20° to 30°, and furthermore, the inclination angle θ may be 25° to 30°.

According to the present disclosure, the elbow 100 is made of a metal material. In addition, the elbow 100 may be made of aluminum. In particular, dissimilar materials between blowout oil and metal or aluminum have low adhesion to each other. This allows the blowout oil passing through the elbow 100 according to the present disclosure to be more easily directed toward the turbocharger 20.

Figure 9:
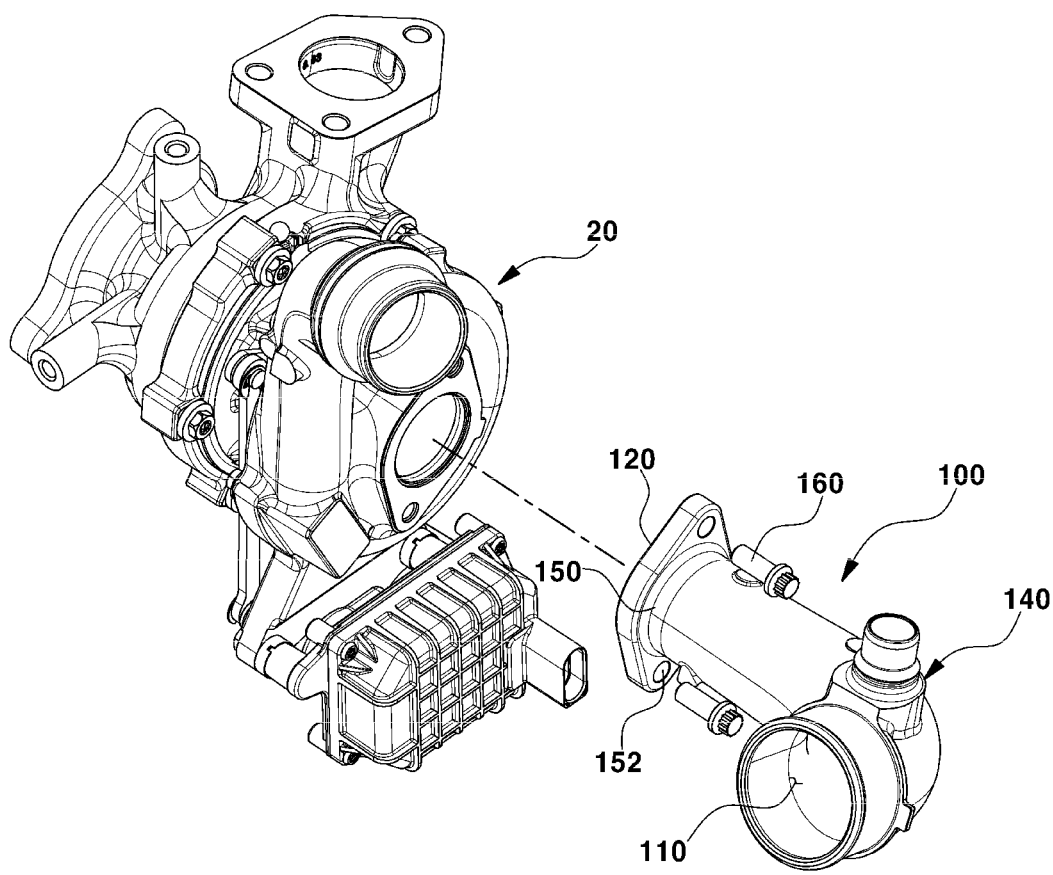
FIG. 9 is an exploded perspective view of the elbow for a turbocharger and the turbocharger according to the present disclosure.

As shown in FIG. 9, the elbow 100 includes a mounting part 150 on the side of the outlet 120. The mounting part 150 is mounted on the turbocharger 20, and the fastening member 160 is mounted through a hole 152 provided in the mounting part 150 so that the elbow 100 may be coupled to the turbocharger 20.

With reference back to FIG. 2 and the like, the hose 40 is provided between the air cleaner 10 and the elbow 100. One end of the hose 40 is directly connected to the air cleaner 10, and an opposite end of the hose 40 is connected to the inlet 110 of the elbow 100. Here, the hose 40 may be made of plastic or rubber.

Figure 10A:
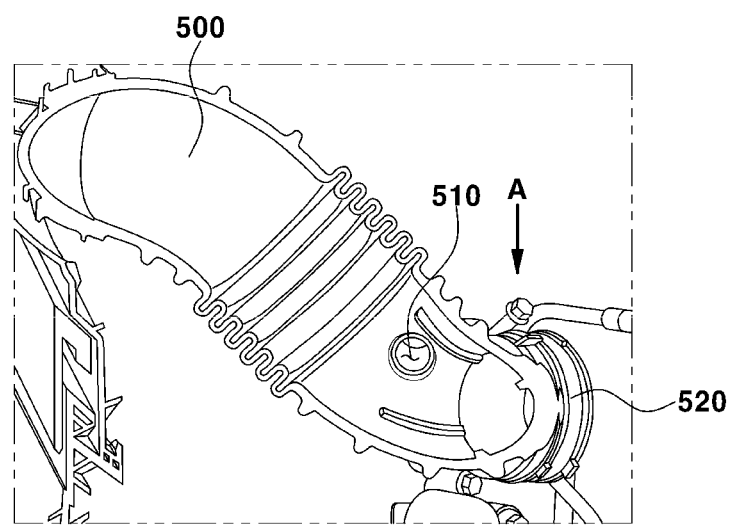
FIG. 10A (RELATED ART) is a cutaway view showing a conventional intake hose.
Figure 10B:
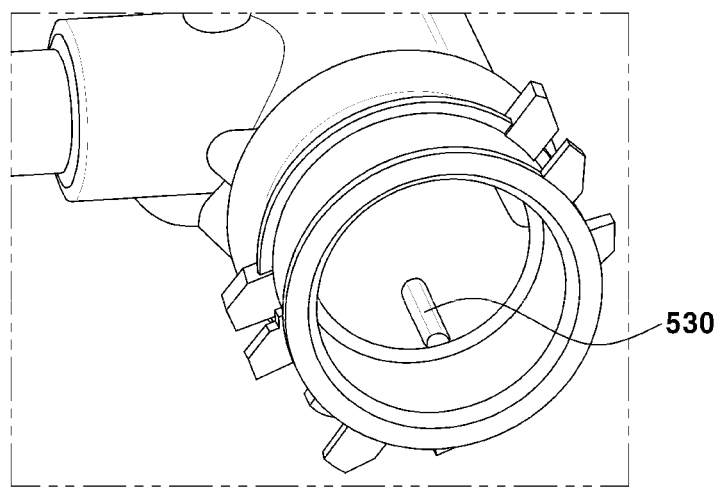
FIG. 10B (RELATED ART) is a view showing one side end of the conventional intake hose.

FIGS. 10A and 10B (RELATED ART) show a conventional supply configuration of blowout oil.

As mentioned above, conventionally, a supply unit 510 to which the blowout oil is supplied is located in an intake hose 500.

Like "A" in FIG. 10A, the intake hose 500 is connected to the inlet of the turbocharger 20 and is mounted with a clamp 520 therearound. At this time, a hiatus occurs between the hose 500 and the inlet of the turbocharger 20 due to tightening torque, and a space or a step is generated therebetween.

Such a step causes oil flowing from the intake hose 500 to the turbocharger 20 to accumulate and becomes a factor preventing the inflow of the blowout oil to the turbocharger 20. However, the present disclosure may facilitate the inflow of the blowout oil to a side of the turbocharger 20 by removing such elements.

As shown in FIG. 10B, a protrusion 530 that is configured to prevent surge at a conventional structure is formed on an inner periphery of the hose 500, but an effect is not satisfactory. This is because the size and number of the protrusions 530 are limited due to an influence of an intake pressure or a problem of moldability. On the other hand, in the present disclosure, by allowing the outlet 32 of the oil line 30 to protrude from the cross section of the passageway part 130 through the fusion part 140, the oil line 30 as a single structure may play a role as large protrusions having a large height and width. Due to this, it is possible to reduce the surge by interfering with the surge flow with the flow of the blow-by gas.

The elbow according to the present disclosure is made of metal so as to remarkably reduce the adhesion of blowout oil compared to conventional rubber or plastic materials, thereby allowing the inflow of blowout oil to the turbocharger to be smoother.

In addition, the elbow according to the present disclosure has a downward inclination toward the turbocharger so allows the flow of blowout oil to a turbocharger side to be smoother due to the head difference, and it is possible to minimize oil accumulation at the connection portion of the turbocharger.

In the fusion part of the elbow according to the present disclosure, the oil line through which blowout oil is introduced may be disposed to extend up to the inside of the cross section of the elbow, thereby providing the effect of reducing the surge of the turbocharger. In addition, when the surge occurs, it may collide with the wall surface of the elbow to reduce the surge energy.

Therefore, according to the present disclosure, the blowout oil in the blow-by gas may easily flow into the turbocharger, and the blowout oil may be prevented from flowing back to the air cleaner by reducing the surge when the surge occurs.

The present disclosure described above is not limited by the above-described embodiments and the accompanying drawings, and it will be apparent to those skilled in the art to which the present disclosure pertains that various substitutions, modifications, and changes are possible without departing from the spirit of the present disclosure.

What is claimed is:

1. A connecting structure of a turbocharger of a vehicle, the connecting structure comprising:
    an elbow including an inlet through which a first fluid is introduced, an outlet through which the first fluid is discharged, a passageway part extending between the inlet and the outlet, and a fusion part provided between the inlet and the outlet and configured to communicate with an inside of the passageway part; and
    an oil line inserted into the fusion part so as to communicate with the inside of the passageway part;
    wherein blowout oil is introduced into the oil line; and
    wherein the oil line extends up to the inside of the passageway part through the fusion part and a direction of the blowout oil discharged from the oil line into the elbow is perpendicular to a direction of the first fluid flowing in the elbow.

2. The connecting structure of claim 1, wherein the inlet is connected to a hose configured to supply the first fluid to the elbow, and the outlet is connected to the turbocharger.

3. The connecting structure of claim 2, wherein the first fluid is air.

4. The connecting structure of claim 2, wherein the hose is configured to receive air from an air cleaner of the vehicle.

5. The connecting structure of claim 2, wherein the elbow is made of a first material and the hose is made of a second material different from the first material.

6. The connecting structure of claim 5, wherein the first material includes metal and the second material include plastic or rubber.

7. The connecting structure of claim 6, wherein the first material is aluminum.

\* \* \* \* \*